US012389925B2

United States Patent
Bowman et al.

(10) Patent No.: US 12,389,925 B2
(45) Date of Patent: Aug. 19, 2025

(54) FOOD POSITIONING TRAY ACCESSORY FOR EDIBLE INK PRINTING DEVICE

(71) Applicants: Nikki Bowman, Denver, NC (US); Jamie Bowman, Denver, NC (US)

(72) Inventors: Nikki Bowman, Denver, NC (US); Jamie Bowman, Denver, NC (US)

(*) Notice: Subject to any disclaimer, the term of this patent is extended or adjusted under 35 U.S.C. 154(b) by 686 days.

(21) Appl. No.: 17/848,511

(22) Filed: Jun. 24, 2022

(65) Prior Publication Data

US 2023/0219710 A1 Jul. 13, 2023

Related U.S. Application Data

(60) Provisional application No. 63/297,560, filed on Jan. 7, 2022.

(51) Int. Cl.
| | |
|---|---|
| A23G 3/28 | (2006.01) |
| A23P 20/15 | (2016.01) |
| B65D 1/34 | (2006.01) |
| B65D 1/36 | (2006.01) |

(52) U.S. Cl.
CPC ............. *A23G 3/28* (2013.01); *A23P 20/15* (2016.08); *B65D 1/34* (2013.01); *B65D 1/36* (2013.01)

(58) Field of Classification Search
CPC .... B65D 1/34; B65D 1/36; A23G 3/28; A23P 20/15; Y02P 90/02; G05B 2219/36186; G05B 2219/36231; G05B 19/4093
See application file for complete search history.

(56) References Cited

U.S. PATENT DOCUMENTS

| | | | | |
|---|---|---|---|---|
| 4,227,484 A | * | 10/1980 | Vaca | A21C 15/002 118/18 |
| 4,624,057 A | * | 11/1986 | Hursey | B43L 9/002 33/570 |
| 4,676,005 A | * | 6/1987 | Seligman | G01B 5/25 33/525 |
| 5,791,062 A | * | 8/1998 | Walker | D05B 97/12 33/565 |
| 6,202,530 B1 | * | 3/2001 | Cawley | C03B 33/04 33/27.07 |
| 9,545,112 B1 | * | 1/2017 | Strauss | B26D 3/24 |
| 2010/0258471 A1 | * | 10/2010 | Enriquez | B65D 1/34 220/608 |

(Continued)

FOREIGN PATENT DOCUMENTS

| | | | | |
|---|---|---|---|---|
| FR | 2935286 A1 | * | 3/2010 | ............ A47G 19/022 |
| WO | WO-2010055204 A1 | * | 5/2010 | ............. B65D 1/243 |

OTHER PUBLICATIONS

DTM Print, DTM Manual Trays for Eddie the Edible Ink Printer—print on any shape, Apr. 13, 2021, web, https://www.youtube.com/watch?v=oenQhcE55D0.*

*Primary Examiner* — Ibrahime A Abraham

(57) ABSTRACT

An apparatus for use with an edible ink printer such as the Primera Eddie® edible ink printer for the consistent placement of food hems on a rotating carousel platter printer feed mechanism, said apparatus being a tray insert accessory which fits onto said platter in place of a nominally-sized food item and comprises a tab for consistent placement of the tray with respect to the platter and a protruding alignment system for consistent placement of food items on the tray, allowing the use of said edible ink printer and carousel platter with food items of a much larger variety of shapes and sizes.

1 Claim, 10 Drawing Sheets

(56) References Cited

U.S. PATENT DOCUMENTS

| | | | |
|---|---|---|---|
| 2014/0099418 A1* | 4/2014 | Getzinger | A47G 19/022 426/520 |
| 2014/0160273 A1* | 6/2014 | Jedynak | H04N 7/18 348/95 |
| 2015/0134571 A1* | 5/2015 | Getzinger | A47G 19/022 269/295 |
| 2017/0079474 A1* | 3/2017 | Stephen | A23P 30/10 |
| 2023/0070970 A1* | 3/2023 | Lee | B65D 1/34 |

* cited by examiner

FOOD POSITIONING TRAY ACCESSORY FOR EDIBLE INK PRINTING DEVICE

CROSS REFERENCE TO RELATED APPLICATION

The present application claims priority through U.S. Provisional patent application 63/297,560 filed 7 Jan. 2022, which is incorporated herein by reference.

TECHNICAL FIELD

The present invention relates to apparatuses such as frames, stencils, and/or trays which are used for centering, positioning, aligning, or holding in place items which are being drawn or printed upon.

BACKGROUND OF THE INVENTION

The edible ink printer is a consumer device and baking appliance which prints a customized image onto a food item, for example a cookie, using edible ink. One such edible ink printer is the Primera Eddie®. Typically, the printer has two modes of operation: using a rotating carousel platter to automatically hold and reposition multiple food items for individual prints, or using a so-called "manual feed" system to print on one food item at a time. The rotating carousel, while being a more efficient mode of operation, is limited to food items of a limited range of sizes and shapes, due to the placement of protruding pegs used for positioning and alignment of said triad items, and further due to the size and shape of cut-out slots for admitting the mechanism which lifts each food item out of the carousel platter and repositions it for printing. The manual feed mode, while more time-consuming and labor-intensive, admits a larger variety of food item shapes and sizes. In the rotating carousel mode of operation, a carousel platter which can hold up to 12 food items is rotated to a specific angle, allowing the printer to access a specific position and associated food item. The food item is then lifted away from the platter, repositioned under the printer head, applied with a desired image in edible ink, and re-placed on the platter. The printed food items can be swapped out with imprinted food items manually by a user as the platter rotates. In order to achieve consistent positioning of a given image on a food item, the food item must have a size and shape such that it can be consistently aligned using the protruding positioning pegs. This generally limits the food item dimensions to circular foods of a narrow range of diameters.

There are a small number of tray accessories available from edible ink printer manufacturers such as Primera for accommodating and aligning food items of a different specific size or shape, but there is no accessory which can be used with the carousel platter to enable the quick and consistent positioning of food items of arbitrary shape and a large range of sizes for print application by an edible ink printer, such as the Primera Eddie edible ink printer. The present invention provides such a solution.

SUMMARY OF THE INVENTION

The present invention is an apparatus for use with edible ink printers, including the Primera Eddie® edible ink printer, for the consistent placement of food items on a printer feed mechanism, said apparatus being a tray insert accessory which fits onto said feed mechanism in place of a nominally-sized food item and comprises several features allowing the use of said edible ink printer with food items of a much larger variety of shapes and sizes. To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

BRIEF DESCRIPTION OF THE DRAWINGS

For a better understanding of the present invention including the features, advantages and specific embodiments, reference is made to the following detailed description along with accompanying Figures, in which.

DETAILED DESCRIPTION

While the making and using of the disclosed embodiments of the present invention is discussed in detail below, it should be appreciated that the present invention provides many applicable inventive concepts which can be embodied in a wide variety of specific contexts. Some features of the preferred embodiments shown and discussed may be simplified or exaggerated for illustrating the principles of the invention.

Figure 9:
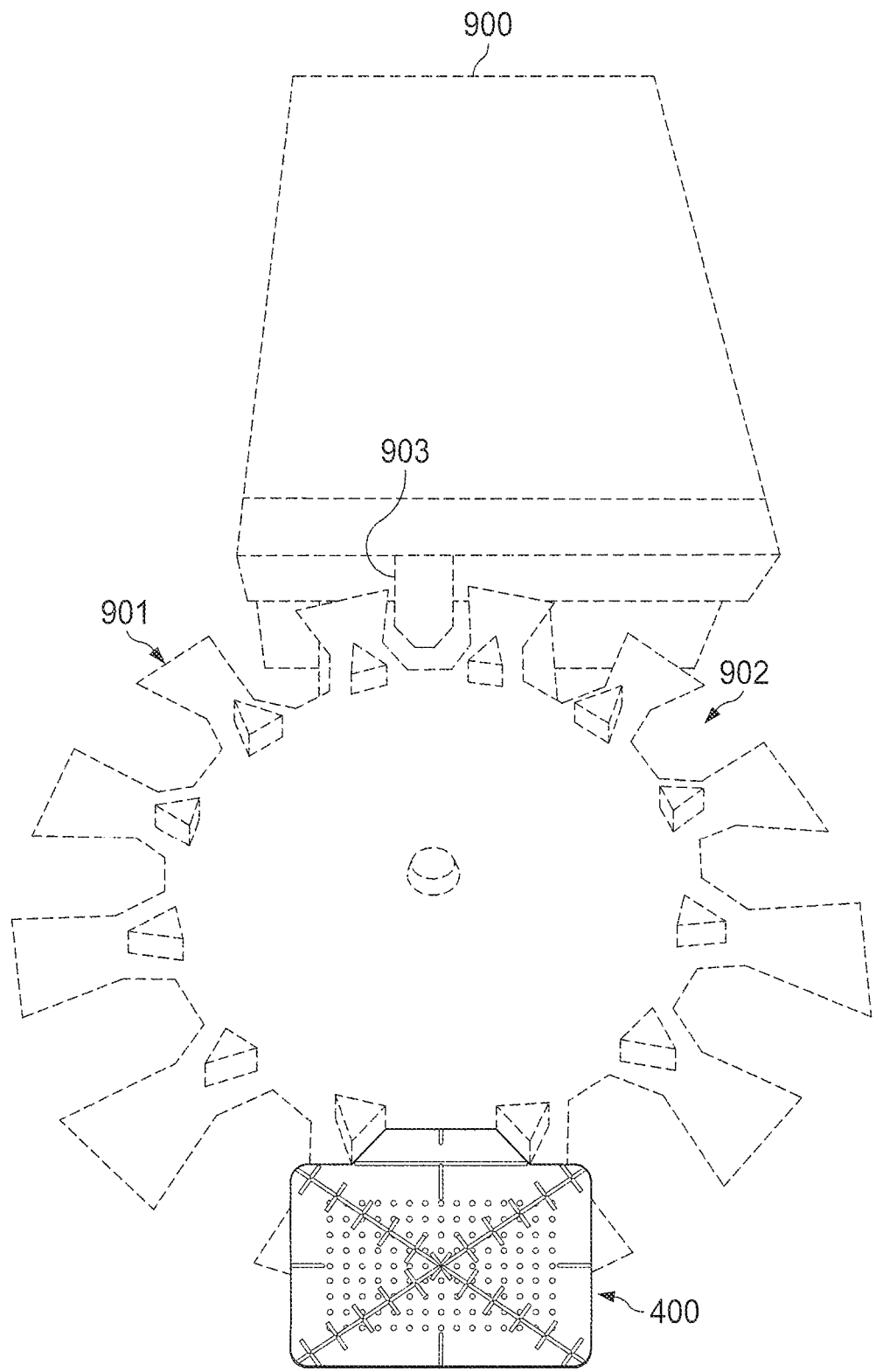
FIG. 9 is a top-front perspective view of one configuration of the tray in use with the carousel and edible ink printer, in an embodiment of the present invention.

The present invention is an accessory apparatus for use with an edible ink printer 900 (prior art), referencing FIG. 9, including the Primera Eddie® edible ink printer, which facilitates the fast and consistent positioning of food items of arbitrary shapes and a large range of sizes on a printer feed mechanism, enabling the consistent alignment of printed images on said food items while maintaining an efficient workflow. In the preferred embodiment of the present invention, said printer feed mechanism comprises a rotating circular carousel platter 901 having a plurality of equally spaced positioning pegs 902 protruding from its upper surface, said pegs being arranged in a ring having a center coincident with the center of the carousel platter and a specific radius, the distance from the radius of the ring of pegs to the outside edge of said platter determining the maximum allowable size of a food item for printing, each of said food items being placed between the ring of positioning pegs and the outside edge of said platter so that they contact two of said positioning pegs; said carousel platter further comprises between each pair of pegs a cut-out slot aligned radially with said platter and extending from a point between the pegs and the outside edge of said platter through said outside edge of said platter, each of said cut-outs being dimensioned to accommodate the movement of a secondary printer feed mechanism which transfers a food item from said platter to area under which a moveable printer head of said edible ink printer ranges; said edible ink printer further comprises a hard plastic tongue 903 dimensioned to fit in said cut-out slots and which is operable to move vertically from below to above the carousel platter in order to transfer items carried by said carousel platter to the printing mechanism; said positioning pegs being dimensioned as primarily triangular prisms or cylinders.

Figure 1:
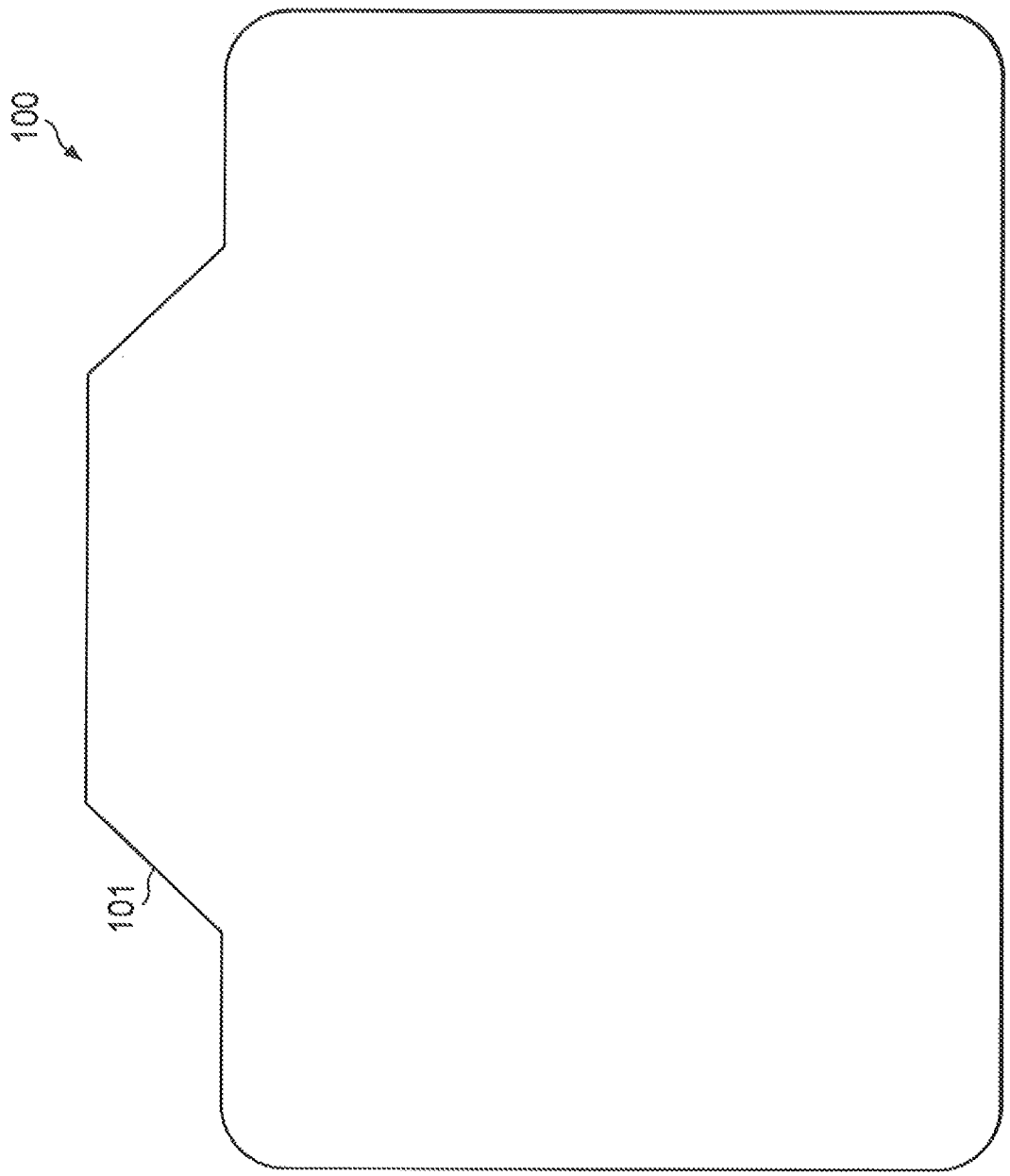
FIG. 1 is a top planform view of the tray in a plain configuration in an embodiment of the present invention.

Referring to FIG. 1, in an embodiment of the present invention, the apparatus is an accessory being a thin rectangular tray 100 defining an upper surface parallel with the upper surface of said carousel platter, a lower surface parallel with and oriented opposite to said upper surface, an outer edge between said upper and lower surfaces and oriented such that it is facing outward with respect to the center of said platter, an inner edge between said upper and lower surfaces oriented opposite said outer edge, and lateral edges between said upper and lower surfaces and between said inner and outer edges, said tray comprising a placement tab 101 and a variety of alignment system configurations; said placement tab 101 is a trapezoidal tab extending from the inner edge of said tray toward the center of said carousel platter, said placement tab being dimensioned to fit laterally in the space defined by said protruding positioning pegs on said carousel platter such that said tray, once placed on said platter and pushed toward the center of said platter to the furthest extent, is in contact with two positioning pegs, one on each side of said placement tab, the movement of said tray being thereby laterally constrained, as seen in FIG. 9 using as an example a tray 400.

In operation, a baked good or other edible item to be edible ink printed is placed on the accessory tray invention, such accessory tray invention then being positioned on the carousel platter and is dimensioned to clear the outer edges of the edible ink printer. The baked good or edible item can them be precisely positioned using guidelines on the accessory tray invention. The tray is then repositioned under the area in which the moveable edible ink printer printing head ranges. The movement of a secondary printer feed mechanism which transfers the accessory tray having the edible item thereon from said platter to the area in which the moveable printer head ranges.

Figure 2:
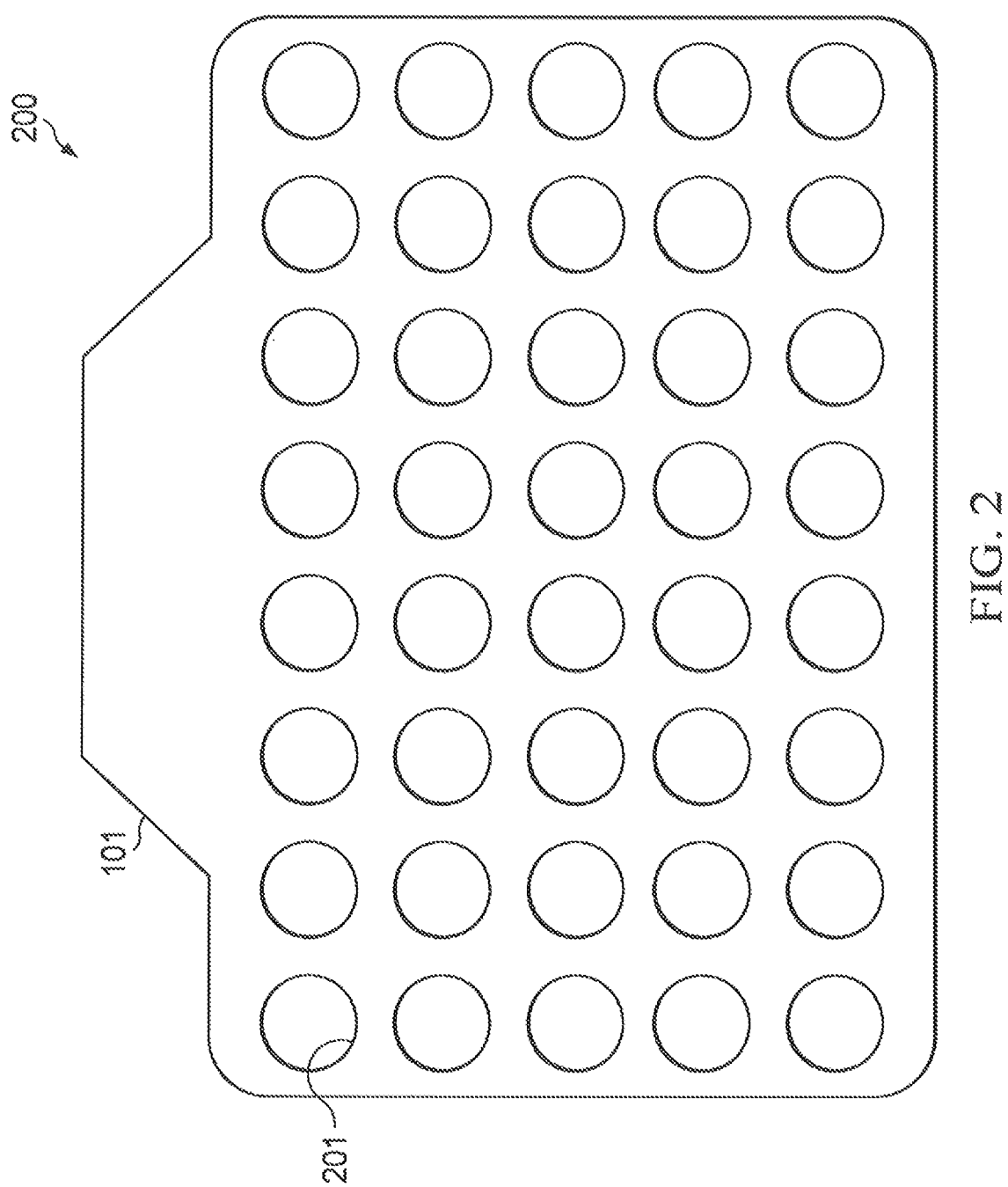
FIG. 2 is a top planform view of the tray in a slotted configuration for use with triangular pegs, in an embodiment of the present invention.

In an embodiment of the present invention shown in FIG. 2, the tray 200 comprises a first alignment system configuration consisting of a plurality of circular slots or holes 201 arranged in an evenly spaced rectangular grid and dimensioned to accept and hold a spherical object such as a piece of candy, said tray 200 further comprises a placement tab 101 dimensioned to fit between two triangular pegs. While the pegs shown here are triangular in shape, the tray placement tab can be dimensioned to accept any shape that is used on a carousel, including but not limited triangular, circular, cuboid, etc.

Figure 3:
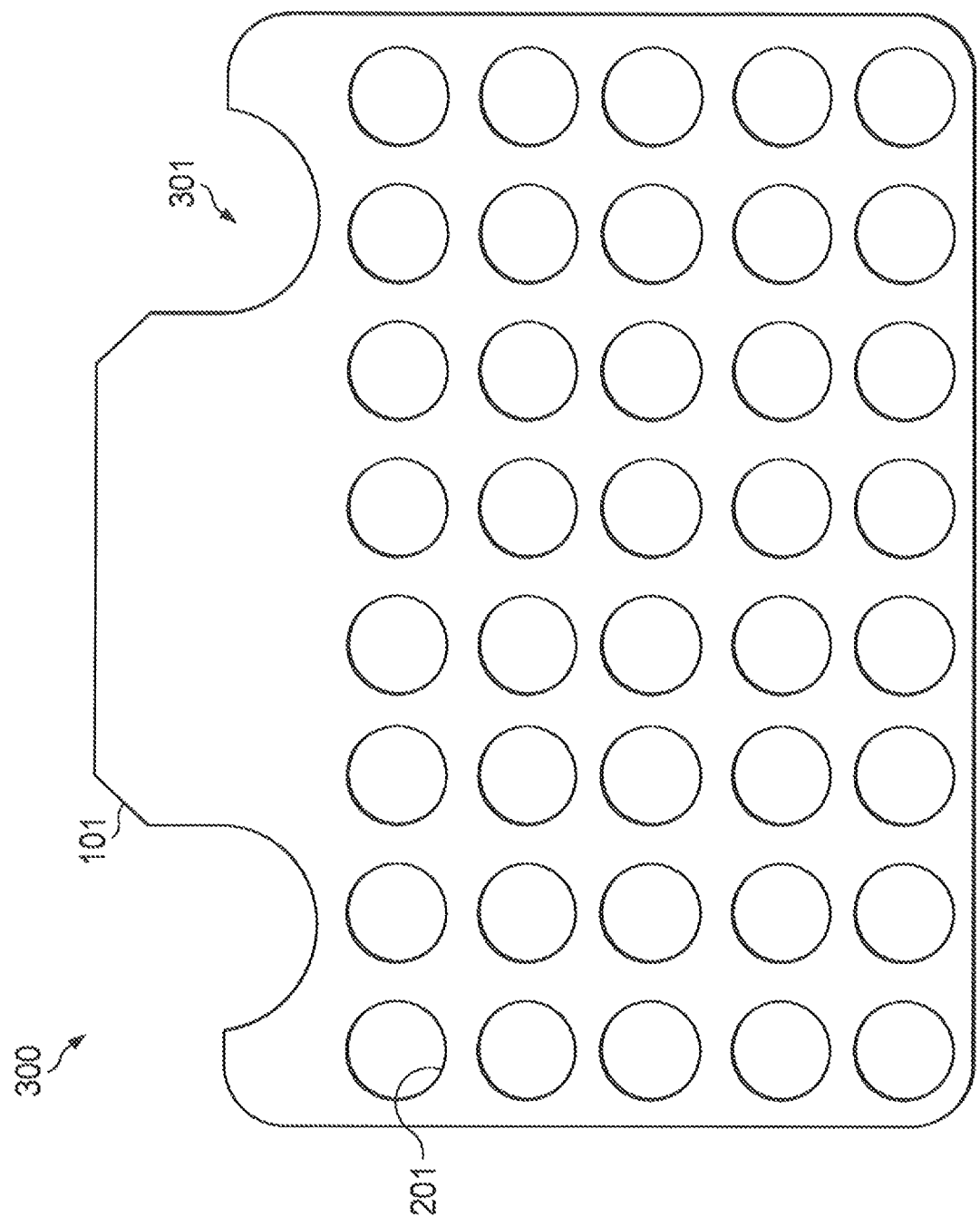
FIG. 3 is a top planform view of the tray in a slotted configuration for use with circular pegs, in an embodiment of the present invention.

In another embodiment of the present invention shown in FIG. 3, the tray 300 further comprises a first alignment system configuration, said first alignment system configuration itself comprising a plurality of circular slots or holes 201 arranged in an evenly spaced rectangular grid and dimensioned to accept and hold a spherical object such as a piece of candy; said tray 300 further comprises a placement tab 101 and two circular cutouts 301 dimensioned to accept two circular pegs, the circular cutouts being positioned one on either side of said placement tab 101, equidistant from a line extending from the geometric center of the inner side of said tray 300 to the geometric center of the outer side of said tray 300 and passing through the geometric center of said tray 300. While the pegs shown here are circular in shape, the tray placement tab can be dimensioned to accept any shape that is used on a carousel, including but not limited triangular, circular, cuboid, etc.

Figure 4:
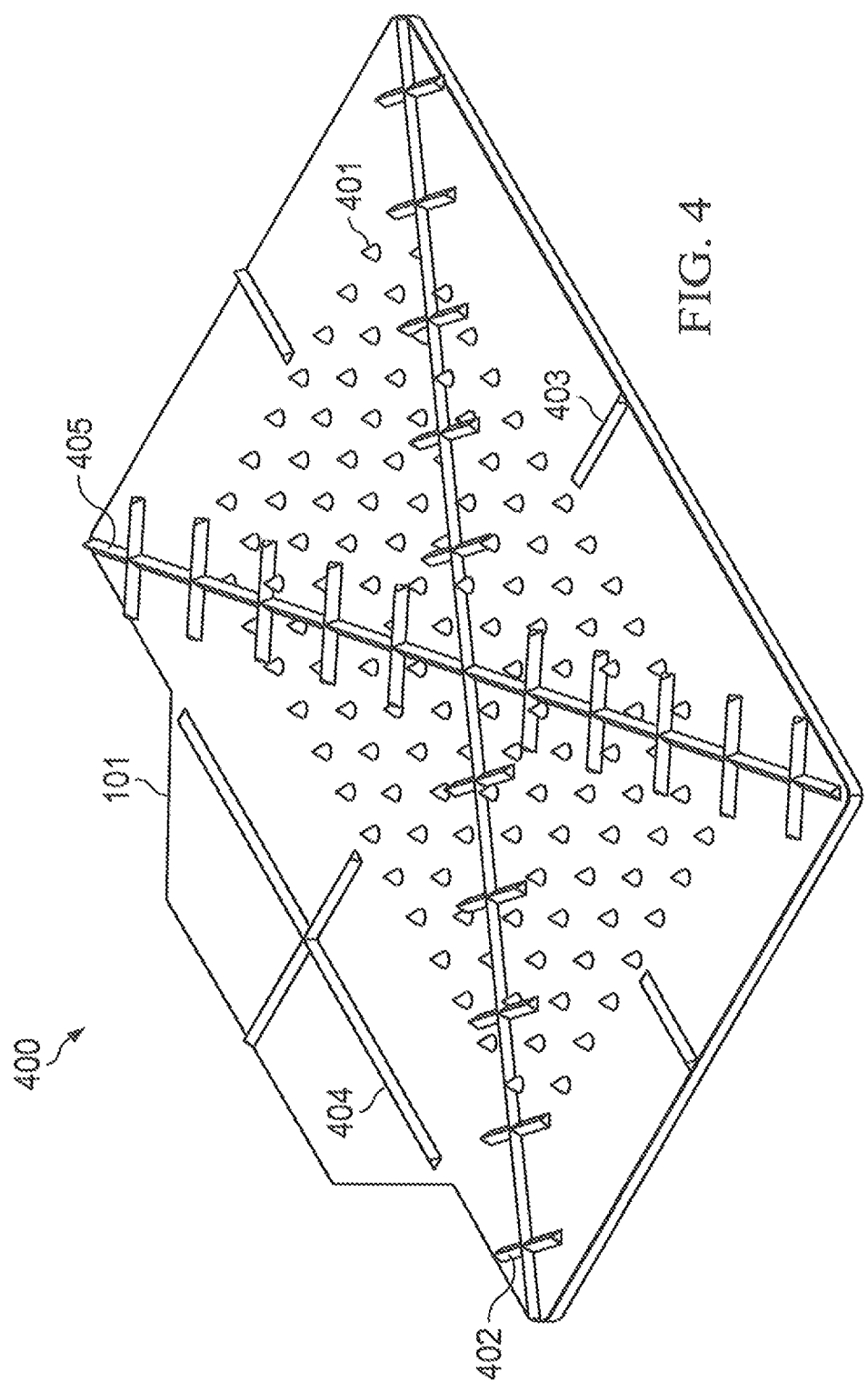
FIG. 4 is a top perspective view of the tray with reference point grid, with diagonal and perpendicular axes, for use with triangular pegs, in an embodiment of the present invention.

In a further embodiment of the present invention shown in FIG. 4, the tray 400 comprises a placement tab 101 dimensioned to fit between two triangular pegs; said tray 400 further comprises a second alignment system configuration, said second alignment system configuration itself comprising a plurality of short protrusions 401 from the upper surface of said tray arranged in an evenly-spaced reference grid and positioned such that the protrusion defining the center of said tray is aligned with the origin of the coordinate system of the printer when said tray is properly positioned on said carousel platter; said second alignment system configuration further comprises a pair of diagonal axes 405 protruding a short distance from the upper surface of said tray, said diagonal axes being dimensioned as two thin crossing lines which intersect at the same center of said tray as is defined by the protruding reference grid, said second alignment system configuration further comprising, on each diagonal line a plurality of short, evenly-spaced hatch marks 402 for accurate positioning along each line; said second alignment system configuration yet further comprises a plurality of thin lines 403 defining a pair of perpendicular axes protruding a short distance from the upper surface of said tray and extending from the outer perimeter of said tray 400 toward the geometric center of said tray 400, aligned with the protrusion grid and defining a rectilinear coordinate system of the tray 400; said alignment system further comprising a thin line 404 extruded from the upper surface of said tray 400 defining the separation between the rectangular portion of said tray 400 and the placement tab 101, in FIG. 4. The protrusions 401 are operable to restrict the movement of a cookie or edible item that is placed upon the tray as the protrusions contribute a coefficient of friction to the underside of the cookie or edible item. In another aspect of the invention, a component thereof is a washable circular disk made of a resilient material that mimics the size of a cookie so that a user of the invention can align and pre-print a design thereon prior to actually printing on a cookie as a test. The circular disk is of any suitable shape and diameter that can be fit upon the tray and is amenable to having edible ink washed off after being used as a test subject.

Figure 5:
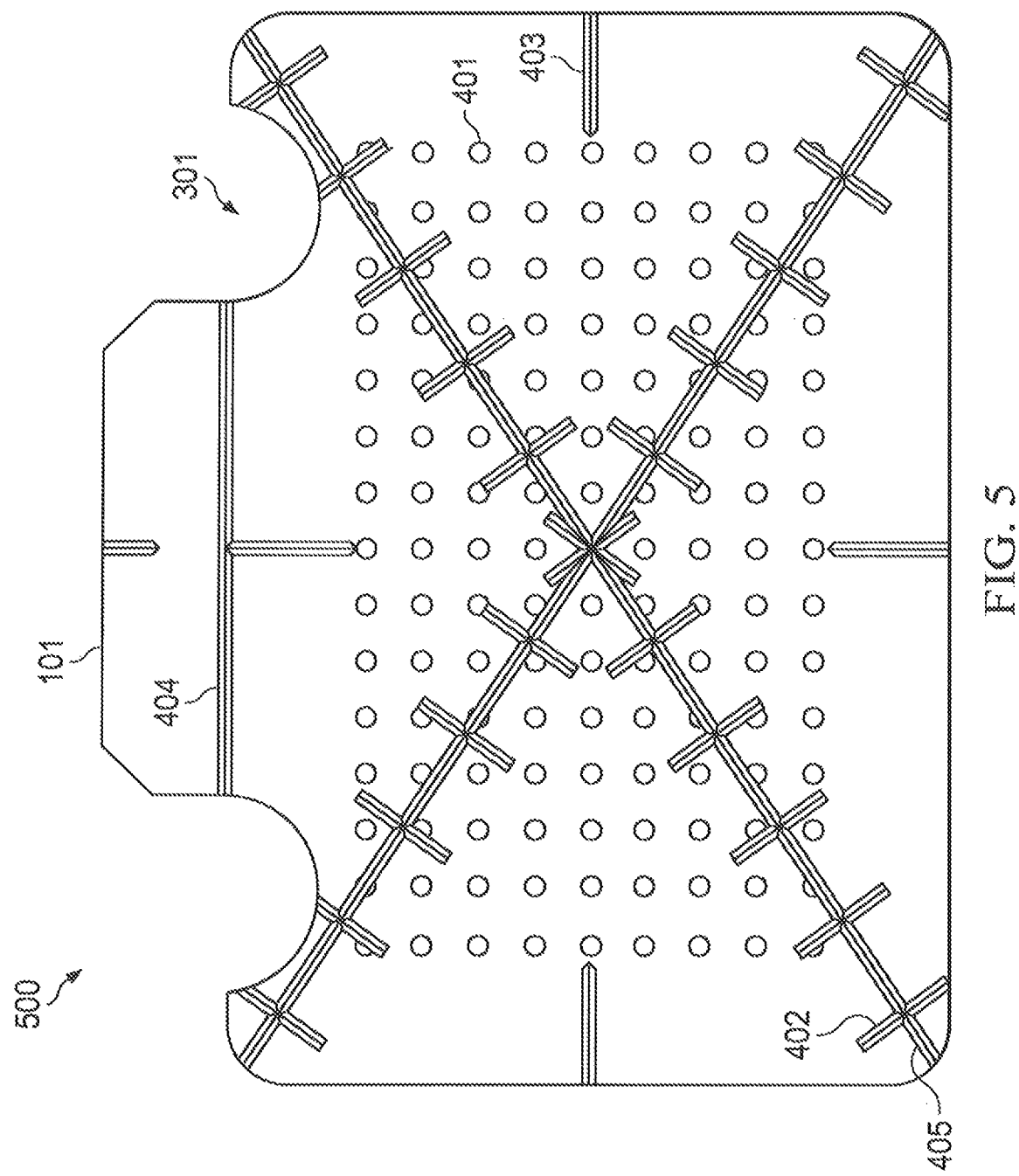
FIG. 5 is a top planform view of the tray with reference point grid, with diagonal and perpendicular axes for use with circular pegs, in an embodiment of the present invention.

In another embodiment of the present invention shown in FIG. 5, the tray 500 comprises a placement tab 101 and two circular cutouts 301 dimensioned to accept two circular pegs, the circular cutouts being positioned one on either side of said placement tab 101 of FIG. 5, said circular cutouts being positioned equidistant from a line extending from the geometric center of the inner side of said tray 500 to the geometric center of the outer side of said tray 500 and passing through the geometric center of said tray 500; said tray 500 further comprises a second alignment system configuration, said second alignment system configuration itself comprising a plurality of short protrusions 401 from the upper surface of said tray arranged in an evenly-spaced reference grid and positioned such that the protrusion defining the center of said tray is aligned with the origin of the coordinate system of the printer when said tray is properly positioned on said platter; said second alignment system configuration further comprises a pair of diagonal axes 405 protruding a short distance from the upper surface: of said, tray, said diagonal axes being dimensioned as two thin crossing lines which intersect at the same center of said tray 500 as is defined by the protruding reference grid, said second alignment system configuration further comprising on each diagonal line a plurality of short, evenly-spaced hatch marks 402 for accurate positioning along each line; said second alignment system configuration yet further comprises a plurality of thin lines 403 defining, a pair of perpendicular axes protruding a short distance from the upper surface of said tray 500 and extending from the outer perimeter of said tray 500 toward the geometric center of said tray 500, aligned with the protrusion grid and defining a rectilinear coordinate system of the tray 500; said alignment system further comprising a thin line 404 extruded from the upper surface of said tray 500 defining the separation between the rectangular portion of said tray 500 and the placement tab 101, in FIG. 5. The alignment system is operable to hold a cookie or other edible item in place as the extrusions contribute a coefficient of friction to the underside of the cookie or baked item so as to restrict its movement when placed on the tray.

In another embodiment of the present invention, a general alignment system configuration comprises a plurality of short protrusions from the upper surface of said tray arranged in an evenly-spaced grid and positioned such that the protrusion defining the center of said tray is aligned with the origin of the coordinate system of the printer when said tray is properly positioned on said platter.

In a further embodiment of the present invention, a general alignment system configuration comprises a pair of diagonal axes protruding a short distance from the upper surface of the associated tray, said diagonal axes being dimensioned as two thin crossing lines which intersect at the geometric center of the associated tray, said general alignment system further comprising on each diagonal line a plurality of short, evenly-spaced hatch marks for accurate positioning along each line.

In a yet further embodiment of the present invention, a general alignment system configuration comprises a plurality of thin lines defining a pair of perpendicular axes protruding a short distance from the upper surface of the associated tray and extending from the outer perimeter of the associated tray toward the geometric center of said tray 400, aligned with the protrusion grid and defining a rectilinear coordinate system of the associated tray.

Figure 6:
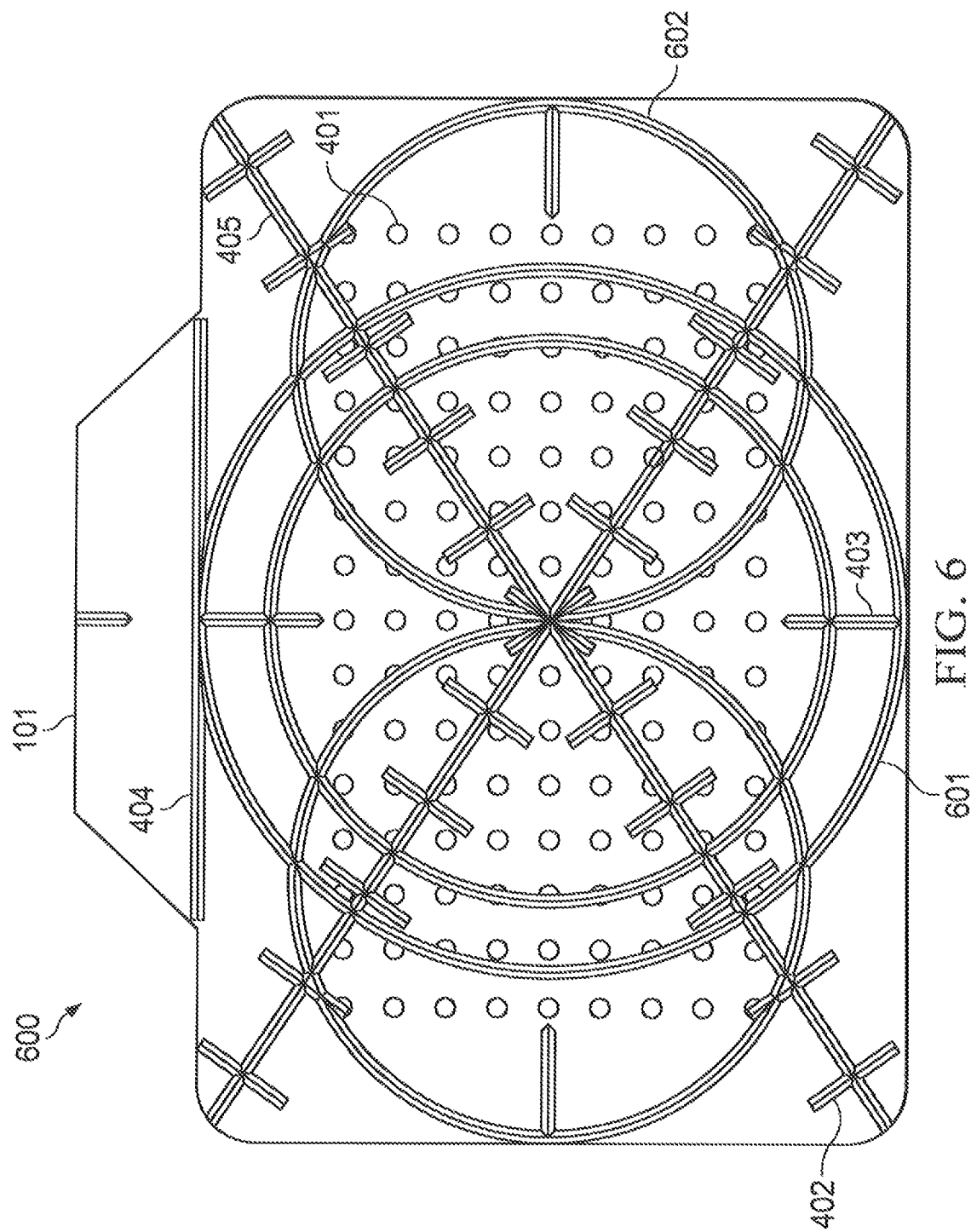
FIG. 6 is a top planform view of the tray with reference point grid, with diagonal and perpendicular axes, and concentric and adjacent circles, for use with triangular pegs, in an embodiment of the present invention.

In a further embodiment of the present invention shown in FIG. 6, the tray 600 comprises a placement tab 101 dimensioned to fit between two triangular pegs; said tray 600 further comprises a third alignment system configuration, said third alignment system configuration itself comprising a plurality of short protrusions 401 from the upper surface of said tray 600 arranged in an evenly-spaced reference grid and positioned such that the protrusion defining the center of said tray 600 is aligned with the origin of the coordinate system of the printer when said tray 600 is properly positioned on said carousel platter: said third alignment system configuration further comprises a pair of diagonal axes 405 protruding a short distance front the upper surface of said tray 600, said diagonal axes being dimensioned as two thin crossing lines which intersect at the same center of said tray 600 as is defined by the protruding reference grid, said third alignment system further comprising on each diagonal line a plurality of short, evenly-spaced hatch marks 402 for accurate positioning along each line; said third alignment system configuration yet further comprises a plurality of thin lines 403 defining a pair of perpendicular axes protruding a short distance from the upper surface of said tray and extending from the outer perimeter of said tray 600 toward the geometric center of said tray 600, aligned with the protrusion grid and defining a rectilinear coordinate system of the tray 600; said third alignment system configuration further comprising a thin line 404 extruded from the upper surface of said tray 600 defining the separation between the rectangular portion of said tray 600 and the placement tab 101, in FIG. 6 said third alignment system yet further comprises a pair of centered, concentric circles 601 and a pair of adjacent, adjoining circles 602, said centered, concentric circles 601 being positioned one inside the other and having their center point coincident with the geometric center of the rectangular section of said tray 600 as defined by said third alignment system, the radius of the outer concentric circle being approximately equal to the distance from said geometric center of said rectangular section of said tray 600 to the outer edge of said tray 600; said adjacent, adjoining circles 602 being arranged side-by-side and positioned such that they intersect at a single point located at the geometric center of the rectangular section of said tray 600 as defined by said third alignment system configuration, the center points of said adjacent, adjoining circles lying on a line extending from the midpoint of one lateral edge of said tray 600 through the geometric center of said tray 600 as defined by said third alignment system configuration to the midpoint of the opposite lateral edge of said tray 600, the diameter of each of said adjacent, adjoining circle being equal to the distance from the geometric center of said tray 600 as defined by said third alignment system configuration to the midpoint of either lateral edge of said tray 600.

Figure 7:
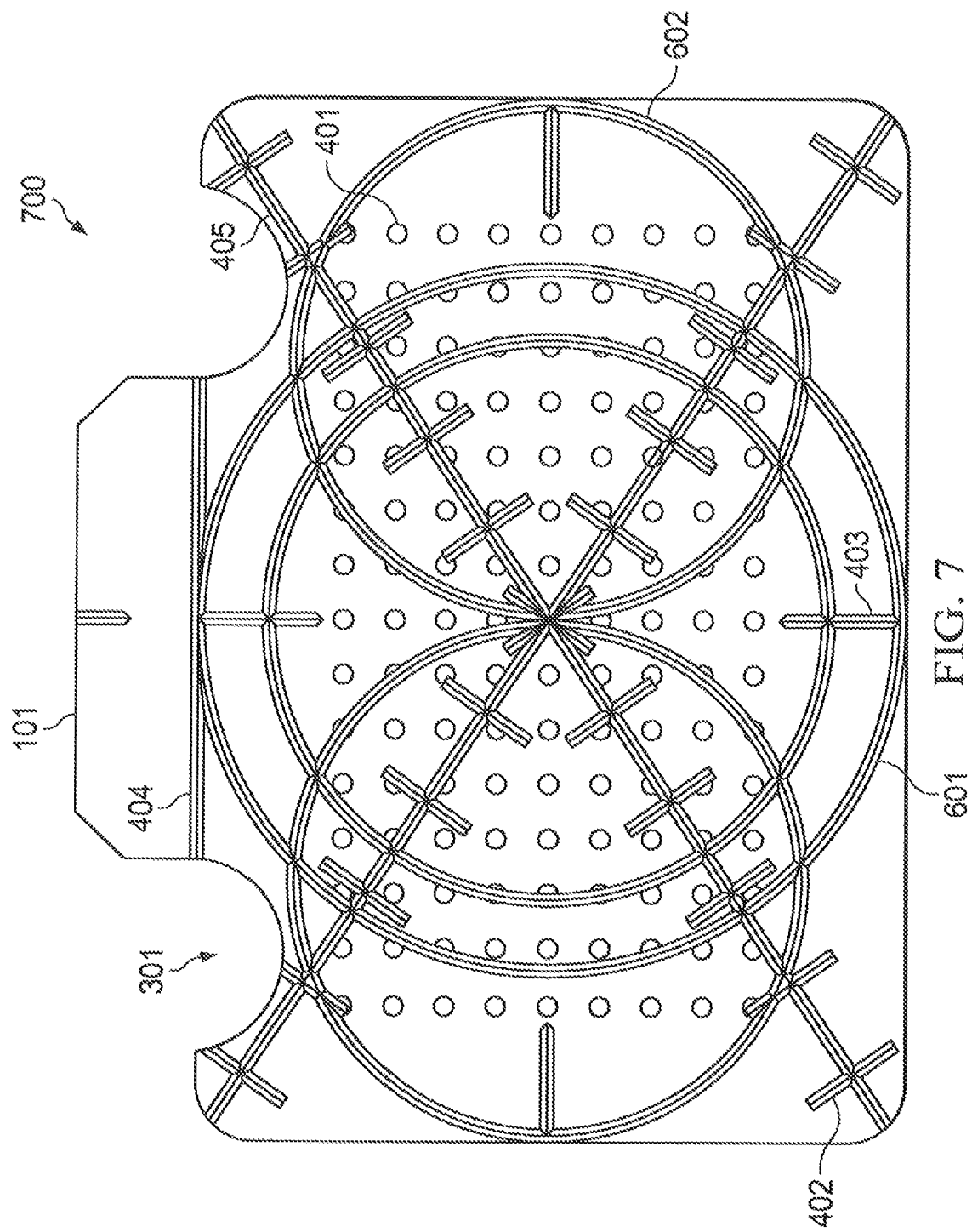
FIG. 7 is a top planform view of the with reference point grid, with diagonal and perpendicular axes, and concentric and adjacent circles, tier use with circular pegs, in an embodiment of the present invention.

In another embodiment of the present invention shown in FIG. 7, the tray 700 comprises a placement tab 101 and two circular cutouts 301 dimensioned to accept two circular pegs, the circular cutouts being positioned one on either side of said placement tab 101 of FIG. 7, said circular cutouts being positioned equidistant from a line extending from the geometric center of the inner side of said tray 700 to the geometric center of the Outer side of said tray 700 and passing through the geometric center of said tray 700; said tray 700 further comprises a third alignment system configuration, said third alignment system configuration itself comprising a plurality of short protrusions 401 from the upper surface of said tray arranged in an evenly-spaced reference grid and positioned such that the protrusion defining the center of said tray is aligned with the origin of the coordinate system of the printer when said tray is properly positioned on said platter; said third alignment system configuration further comprises a pair of diagonal axes 405 protruding a short distance from the upper surface of said tray 700, said diagonal axes being dimensioned as two thin crossing lines which intersect at the same center of said tray as is defined by the protruding reference grid, said alignment system further comprising on each diagonal line a plurality of short, evenly spaced hatch marks 402 for accurate positioning along each line; said third alignment system yet further comprises a plurality of thin lines 403 defining a pair of perpendicular axes protruding a short distance from the upper surface of said tray and extending from the outer perimeter of said tray 700 toward the geometric center of said tray 700, aligned with the protrusion grid and defining a rectilinear coordinate system of the tray 700; said alignment system further comprising a thin line 404 extruded from the upper surface of said tray 700 defining the separation between the rectangular portion of said tray 700 and the placement tab 101, in FIG. 7; said third alignment system yet further comprises a pair of centered, concentric circles 601 and a pair of adjacent, adjoining circles 602, said centered, concentric circles 601 being positioned one inside the other and having their center point coincident with the geometric center of the rectangular section of said tray 700 as defined by said third alignment system, the radius of the outer concentric circle being approximately equal to the distance from said geometric center of said rectangular section of said tray 700 to the outer edge of said tray 700; said adjacent, adjoining circles 602 being arranged side-by-side and positioned such that they intersect at a single point located at the geometric center of the rectangular section of said tray 700 as defined by said third alignment system configuration, the center points of said adjacent, adjoining circles lying on a line extending from the midpoint of one lateral edge of said tray 700 through the geometric center of said tray 700 as defined by said third alignment system configuration to the midpoint of the opposite lateral edge of said tray 700, the diameter of each of said adjacent, adjoining circle being equal to the distance from the geometric center of said tray 700 as defined by said third alignment system configuration to the midpoint of either lateral edge of said tray 700.

Figure 8:
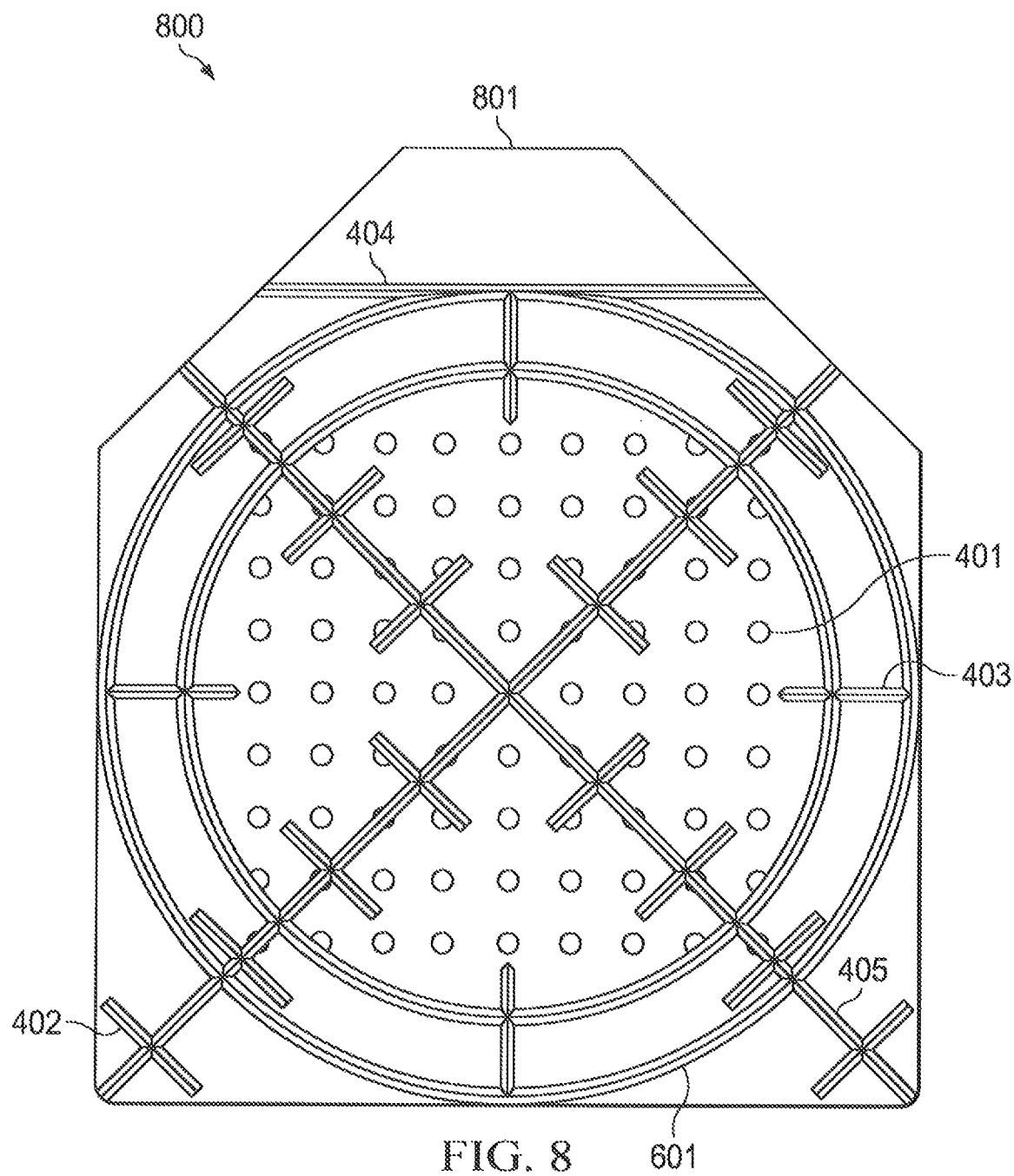
FIG. 8 is a top planform view of the tray with reference point grid, with diagonal and perpendicular axes, and concentric circles, for use with triangular pegs, in an embodiment of the present invention.

In a further embodiment of the present invention shown in FIG. 8, the tray 800 comprises a placement tab 801 dimensioned to fit between two triangular pegs; said tray 800 being dimensioned such that the angle of each side of said tab 801 is maintained until said side of said tab intersects its respective lateral edge of said tray 800, rather than terminating at the placement tab demarcation line 404 as in prior configurations; said tray 800 further comprises a fourth alignment system configuration, said fourth alignment system configuration itself comprising a plurality of short protrusions 401 from the upper surface of said tray 800 arranged in an evenly-spaced reference grid and positioned such that the protrusion defining the center of said tray is aligned with the origin of the coordinate system of the printer when said tray 800 is properly positioned on said carousel platter; said fourth alignment system configuration further comprises a pair of diagonal axes 405 protruding a short distance from the upper surface of said tray 800, said diagonal axes being dimensioned as two thin crossing lines which intersect at the same center of said tray as is defined by the protruding reference grid, said fourth alignment system further comprising on each diagonal line a plurality of short, evenly-spaced hatch marks 402 for accurate positioning along each line; said alignment system yet further comprises a plurality of thin lines 403 defining a pair of perpendicular axes protruding a short distance from the upper surface of said tray and extending from the outer perimeter of said tray 800 toward the geometric center of said tray 800, aligned with the protrusion grid and defining a rectilinear coordinate system of the tray 800; said alignment system further comprising a thin line 404 extruded from the upper surface of said tray 800 defining a separation between the larger portion of said tray 800 and the placement tab 801, in FIG. 8, said larger portion of said tray 800 being dimensioned as an integrated shape consisting of a rectangular section and a trapezoidal section adjoined to the inner edge of said rectangular section; said fourth alignment system yet further comprises a pair of centered, concentric circles 601 and a pair, of adjacent, adjoining circles 602.

Figure 10:
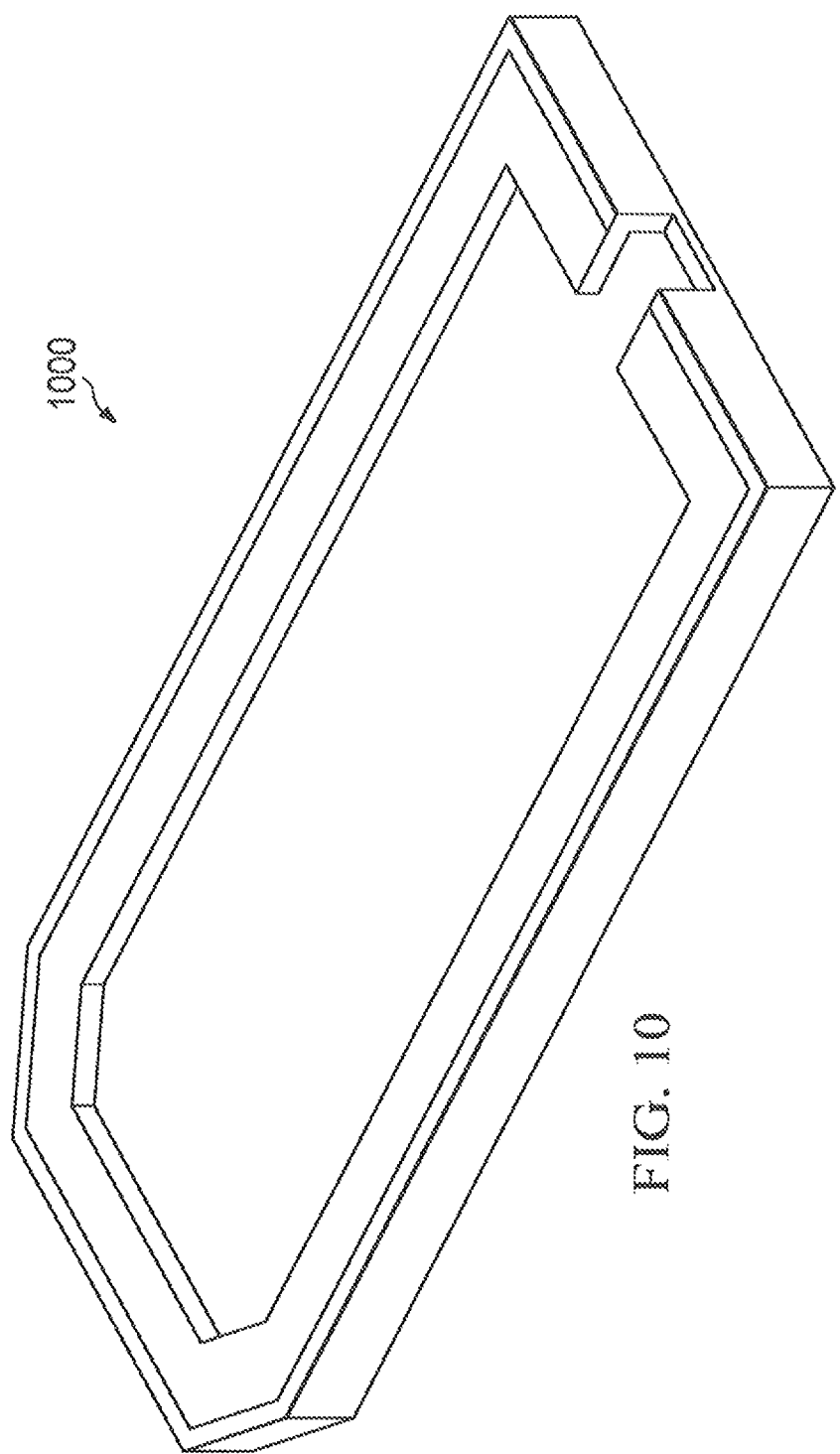
FIG. 10 is a top perspective view of the silicone tongue cover in an embodiment of the present invention.

A further element of the tray system is a tongue cover 1000 shown in FIG. 10 dimensioned to fit snugly over the existing hard plastic printer tongue 903 shown in FIG. 9 to provide additional grip in order to maintain a tray in place so they do not move around while loading, printing, and unloading. It is also operable to hold other items in place on the tongue 903 so they do not move around while printing. Said tongue cover 1000 is dimensioned as a hollow irregular prism having, no bottom surface and an upper surface extending inwards partially from the upper edges of the perimeter of said irregular prism, said irregular prism being dimensioned as an integrated rectangular prism portion and trapezoidal prism portion as shown in FIG. 10. Said tongue cover further comprises a notched cut-out in the perimeter of said rectangular prism portion positioned at the midpoint of the edge opposite the trapezoidal prism portion. The tongue cover 1000 can be made of a silicone material or other resin-based or other gripping or non slip material suitable to hold the tray in place while the tray is on the tongue and moving.

Referring to FIG. 9, to properly position a tray 400 with respect to the carousel platter 901, the tray is placed by a user on top of said platter between the ring of protruding positioning pegs 902 and the outer edge of said platter such that the placement tab of said tray is extending in the direction of the center of the platter and located between two neighboring positioning pegs. The tray is then pushed by the user toward the center of said platter to its furthest extent such that the placement tab is in contact with two positioning pegs, one on each side.

In another embodiment of the present invention, the printer feed mechanism comprises an arm, tray, or tongue 903 which holds one food item and is operable to move it in one or more axes by a conveyance means such as a conveyer belt or linear actuator; in this embodiment the tray apparatus comprises a placement system and alignment system, the placement system being a physical means of coupling said tray to said conveyance means such that the center of the coordinate system of said tray is consistently aligned with the origin of the coordinate system of the printer and the relative position of said tray with respect to said conveyance means is maintained.

A further embodiment of this invention is a rotating carousel platter that is smaller than a conventional carousel platter in combination with the accessory tray discussed herein, said carousel platter being able to accommodate such accessory tray with a lip to lock back into the novel carousel platter, Said carousel platter would accommodate thicker food items for example: cake pop, marshmallows, Rice Krispy® treats, chocolate covered Oreos®, etc, up to the thickness on which an edible printer will print.

FIG. 1 is a top planform view of the tray 100 in a plain configuration in an embodiment of the present invention, in which said tray 100 is dimensioned as a flat rectangular prism having rounded corners and comprises a placement tab 101 extending inward from the inner surface of said tray 100.

FIG. 2 is a top platform view of the tray 200 in a slotted configuration for use with triangular pegs, in an embodiment of the present invention, in which said tray 200 is dimensioned as a flat rectangular prism having rounded corners and comprises a placement tab 101 extending inward from the inner surface of said tray 200 and a plurality of round cut-through holes or slots 201 arranged in an evenly spaced rectangular grid, each of said cut-through holes or slots extending from the upper surface of said tray 200 through the bottom surface of said tray 200. The holes or slots are dimensioned to hold candy such as M&Ms®.

FIG. 3 is a top planform view of the tray 300 in a slotted configuration for use with circular pegs, in an embodiment of the present invention, in which said tray 300 is dimensioned as a flat rectangular prism having rounded corners and comprises a placement tab 101 extending inward from the inner surface of said tray 300, a plurality of round cut-through holes or slots 201 arranged in an evenly spaced rectangular grid, each of said cut-through holes or slots extending from the upper surface of said tray 300 through the bottom surface of said tray 300, and a pair of semicircular cut-outs 301 extending a partial distance from the inner edge of said tray 300 outward. The holes or slots, are dimensioned to hold candy such as M&Ms®.

FIG. 4 is a top perspective view or the tray 400 with reference point grid 401, with diagonal axes 405 and perpendicular axes 403, for use with triangular pegs, in an embodiment of the present invention, in which said tray 400 is dimensioned as a flat rectangular prism and comprises a placement tab 101 extending inward from the inner surface of said tray 400; said tray further comprises as part of its alignment system configuration a plurality of hatch marks 402 along each diagonal line 405 and a line 404 defining the separation between the rectangular section of the tray 400 and the trapezoidal placement tab 101. The point grid 401 comprise protrusions extending from the surface of the tray 400 to restrict via friction, the movement of a cookie or baked good that is placed thereon for printing.

FIG. 5 is a top planform view of the tray 500 with reference point grid 401, with diagonal axes 405 and perpendicular axes 403 for use with circular pegs, in an embodiment of the present invention, in which said tray 500 is dimensioned as a flat rectangular prism and comprises a placement tab 101 extending inward from the inner surface of said tray 500; said tray further comprises as part of its alignment system configuration a plurality of hatch marks 402 along each diagonal line 405, a line 404 defining the separation between the rectangular section of the tray 500 and the trapezoidal placement, tab 101, and a pair of semi-circular cut-outs 301 extending a partial distance from the inner edge of said tray 300 outward.

FIG. 6 is a top planform view of the tray 600 with reference point grid 401, with diagonal axes 405 and perpendicular axes 403, for use with triangular pegs, in an embodiment of the present invention, in which said tray 600 is dimensioned as a flat rectangular prism and comprises a placement tab 101 extending inward from the inner surface of said tray 600; said tray further comprises as part of its alignment system configuration a plurality of hatch marks 402 alone, each diagonal line 405, a line 404 defining the separation between the rectangular section of the tray 600 and the trapezoidal placement tab 101, and concentric circles 601 and adjacent, adjoining circles 602.

FIG. 7 is a top planform view of the tray 700 with reference point grid 401, with diagonal axes 405 and perpendicular axes 403, for use with circular pegs, in an embodiment of the present invention, in which said tray 700 is dimensioned as a flat rectangular prism and comprises a placement tab 101 extending inward from the inner surface of said tray 700; said tray further comprises as part of its alignment system configuration a plurality of hatch marks 402 along each diagonal line 405, a line 404 defining the separation between the rectangular section of the tray 700 and the trapezoidal placement tab 101, concentric circles 601, adjacent adjoining circles 602, and a pair of semi-circular cut-outs 301 extending a partial distance from the inner edge of said tray 700 outward.

FIG. 8 is a top planform view of the tray 800 with reference point grid 401, with diagonal axes 405 and perpendicular axes 403, for use with triangular pegs, in an embodiment of the present invention, in which said tray 800 is dimensioned as a flat rectangular prism and comprises a placement tab 101 extending inward from the inner surface of said tray 800; said tray further comprises as part of its alignment system configuration a plurality of batch marks 402 along each diagonal line 405, a line 404 defining the separation between the larger section of the tray 800 and the trapezoidal placement tab 101, and concentric circles 601.

FIG. 9 is a top-front perspective view of one configuration of the tray 400 in use with the carousel 901 and edible ink printer 900, said carousel 901 further comprises in this configuration a plurality of triangular pegs 902; said edible ink printer further comprises a transfer tab or tongue 903.

FIG. 10 is a top perspective view of the tongue cover component 1000 in an embodiment of the present invention, said tongue cover component being dimensioned to accept the hard plastic or metal tab- or tongue-shaped transfer platform 903 of the edible ink printer 900 as shown in FIG. 9, said tongue having a higher static coefficient of friction than the plastic or metal platform 903 between itself and an associated tray 400 which it is in the process of transferring between said carousel and said edible ink printer, said tongue rover 1000 being thus operable to improve stability of said tray during any transfer motion. The tongue cover 1000 can be made of a silicone material or other resin-based or other gripping or non-slip material suitable to hold the tray in place while the tray is on the tongue and moving. The tongue cover 1000 is dimensioned to fit snugly over a transfer platform of an edible ink printer, said tongue cover operable to provide additional grip to maintain a tray in place so it does not move around while loading, printing, and unloading. The tongue cover further dimensioned as a hollow irregular prism having no bottom surface and an upper surface extending inwards partially from the upper edges of the perimeter of said irregular prism, said irregular prism being dimensioned as an integrated rectangular prism portion and trapezoidal prism portion; said tongue cover further comprises a notched cut-out in the perimeter of said rectangular prism portion positioned at the midpoint of the edge opposite the trapezoidal prism portion.

The embodiments shown and described above are only exemplary. Even though numerous characteristics and advantages of the present invention have been set forth in the foregoing description, the disclosure is illustrative only and changes may be made within the principles of the invention to the full extent indicated by the broad general meaning of the terms used herein. Various alterations, modifications and substitutions can be made to the disclosed invention and the system that implements the present invention without departing in any way from the spirit and scope of the invention.

We claim:

1. An accessory tray apparatus for use with a rotating carousel platter and edible ink printer, said apparatus comprising
    a thin rectangular tray defining an upper surface parallel with the upper surface of said carousel platter, a lower surface parallel with and oriented opposite to said upper surface, an outer edge between said upper and lower surfaces and oriented such that it is facing outward with respect to the center of said platter, an inner edge between said upper and lower surfaces oriented opposite said outer edge, and lateral edges between said upper and lower surfaces and between said inner and outer edges, said tray comprising a placement tab, an alignment system configuration, and a pair of semi-circular cut-outs;

said placement tab is a trapezoidal tab extending from the inner edge of said tray toward the center of said platter, said placement tab being dimensioned to fit laterally in the space defined by positioning pegs protruding from the upper surface of said carousel platter such that said tray, once placed on said platter and pushed toward the center of said platter to the furthest extent, is in contact with two positioning pegs, one on each side of said placement tab, the movement of said tray being thereby laterally constrained;

said alignment system configuration further comprising a plurality of extruded and subtracted features on the upper surface of said tray operable to serve as positioning reference points and guidelines; specifically, said alignment system configuration further comprises a plurality of short, protruding conical spikes or pegs arranged in an evenly-spaced rectangular grid and positioned such that the protruding peg defining the center of said tray is aligned with the origin of the coordinate system of the edible ink printer when said tray is properly positioned on said platter;

said alignment system configuration yet further comprising a pair of intersecting diagonal raised lines extruded slightly from the upper surface of said tray and extending from the outer corners toward the protruding peg defining the center of the positioning reference of said tray;

said alignment system configuration further comprises a plurality of evenly-spaced hatch marks along the extent of both intersecting diagonal raised lines, said hatch marks being raised protrusions extruded slightly from the upper surface of said tray and being oriented such that they are orthogonal to their associated diagonal line;

said alignment system configuration further comprising a plurality of raised lines extruded slightly from the upper surface of said tray and arranged such that each of said raised lines extends a partial distance from the midpoint of one side of said tray toward the protruding peg defining the center of the positioning reference of said tray, there being four lines extending from four corresponding sides, said lines defining a set of orthogonal axes corresponding to the positioning reference system of said tray;

said alignment system configuration further comprising a raised line extruded slightly from the upper surface of said tray and positioned such that it demarcates a separation between said placement tab and the larger rectangular portion of said tray;

said alignment system configuration further comprising a pair of raised concentric circles extruded slightly from the upper surface of said tray and positioned such that the center point of said pair of concentric circles is coincident with the protruding peg defining the center of the positioning reference of said tray, said concentric circles being, dimensioned such that one is smaller than the other;

said alignment system configuration further comprising a pair of raised adjacent, adjoining circles each having a diameter approximately equal to half the width of said tray, said raised adjacent, adjoining circles being extruded slightly from the upper surface of said tray and arranged such that the center points of said circles lie on a line extending from the midpoint of one lateral edge of said tray to the midpoint of the opposite lateral edge of said tray; and said semi-circular cut-outs are arranged one on either side of said placement tab and dimensioned to accept rounded or circular carousel platter positioning, pegs, said semi-circular cutouts extending from the inner edge of said tray a partial distance toward the outer edge of said tray.

* * * * *